US012161250B2

(12) United States Patent
Sekulic et al.

(10) Patent No.: US 12,161,250 B2
(45) Date of Patent: Dec. 10, 2024

(54) BEVERAGE APPARATUS WITH MIXING CHAMBER

(71) Applicant: SOCIETE DES PRODUITS NESTLE S.A., Vevey (CH)

(72) Inventors: Aleksandar Sekulic, Prilly (CH); Yann Mieville, Pomy (CH); Julien Pellegrini, Le Brassus (CH)

(73) Assignee: Societe des Produits Nestle S.A., Vevey (CH)

( * ) Notice: Subject to any disclaimer, the term of this patent is extended or adjusted under 35 U.S.C. 154(b) by 867 days.

(21) Appl. No.: 17/277,402

(22) PCT Filed: Sep. 19, 2019

(86) PCT No.: PCT/EP2019/075246
§ 371 (c)(1),
(2) Date: Mar. 18, 2021

(87) PCT Pub. No.: WO2020/058448
PCT Pub. Date: Mar. 26, 2020

(65) Prior Publication Data
US 2022/0031110 A1    Feb. 3, 2022

(30) Foreign Application Priority Data

Sep. 20, 2018   (EP) ..................................... 18195616

(51) Int. Cl.
*A47J 31/40*   (2006.01)
(52) U.S. Cl.
CPC ............ *A47J 31/401* (2013.01); *A47J 31/40* (2013.01); *A47J 31/404* (2013.01)
(58) Field of Classification Search
CPC ........... A47J 31/401; A47J 31/40; A47J 31/44
(Continued)

(56) References Cited

U.S. PATENT DOCUMENTS

| 2,398,314 A * | 4/1946 | Laereman ............... A47J 31/00 |
| | | 99/287 |
| 2008/0166463 A1* | 7/2008 | Green ................. A47J 31/4485 |
| | | 99/287 |
| 2014/0123859 A1 | 5/2014 | Verbeek |

FOREIGN PATENT DOCUMENTS

| CN | 204210946 U | 3/2015 |
| CN | 104837388 A | 8/2015 |

(Continued)

OTHER PUBLICATIONS

Japanese Office Action for Appl No. 2021-514384 dated May 9, 2023.

(Continued)

*Primary Examiner* — Reginald Alexander
(74) *Attorney, Agent, or Firm* — K&L Gates LLP

(57) ABSTRACT

The invention concerns a beverage preparation apparatus (100), said apparatus comprising at least one chamber (1) for receiving and mixing water and at least one soluble beverage ingredient, said chamber comprising: —a lateral side wall (11) defining an internal mixing volume, —a bottom wall (12) comprising a beverage outlet (3), —at least one water supply device (2) configured for creating a jet of water (21) and orienting said jet of water inside the chamber, —at least one rotating device (4) configured to rotate around a rotational axis inside the mixing chamber, said rotating device comprising blades (41), wherein the blades of the rotating device are freely rotatable around the rotational axis, and wherein the jet of water introduced in the chamber is oriented to hit the blades of the rotating device and actuate the rotation of the rotating device around the rotational axis.

17 Claims, 7 Drawing Sheets

(58) Field of Classification Search
USPC .......................................................... 99/287
See application file for complete search history.

(56) References Cited

FOREIGN PATENT DOCUMENTS

| | | | | | |
|---|---|---|---|---|---|
| CN | 204909094 | U | 12/2015 | | |
| CN | 207012096 | U | 2/2018 | | |
| EP | 0221568 | A2 | 5/1987 | | |
| EP | 1932457 | | 6/2008 | | |
| EP | 2127567 | A1 * | 12/2009 | ............ | A47J 31/401 |
| JP | 2008217056 | A | 9/2008 | | |
| JP | 2010515484 | A | 5/2010 | | |
| WO | WO-2004056246 | A1 * | 7/2004 | ............ | A47J 31/401 |
| WO | 2008038192 | | 4/2008 | | |
| WO | WO-2017198444 | A1 * | 11/2017 | ............ | A47J 31/401 |

OTHER PUBLICATIONS

Chinese Office Action for Appl No. 201980055747.8 dated Aug. 3, 2022.

Japanese Office Action for Appl No. 2021-514384 dated Apr. 25, 2023.

* cited by examiner

BEVERAGE APPARATUS WITH MIXING CHAMBER

CROSS REFERENCE TO RELATED APPLICATIONS

The present application is a National Stage of International Application No. PCT/EP2019/075246, filed on Sep. 19, 2019, which claims priority to European Patent Application No. 18195616.0, filed on Sep. 20, 2018, the entire contents of which are being incorporated herein by reference.

FIELD OF THE INVENTION

The present invention relates to beverage dispensers preparing beverages from a soluble beverage powder and in which a dose of said powder is mixed with a water in a mixing chamber.

BACKGROUND OF THE INVENTION

WO 2008/071613 describes a beverage preparation machine comprising a mixing chamber for preparing frothed beverages wherein a dose of a beverage soluble powder is mixed with water. This mixing chamber presents the great advantage of being devoid of any agitating device driven by a motor. The agitation, dissolution and frothing is obtained by the force of water jet introduced inside the chamber. As a result the manufacturing cost of the machine is low.

Such a mixing chamber is particularly adapted for preparing a frothed coffee beverage from soluble instant coffee. The process of preparation consists in introducing a dose of coffee powder inside the chamber and then introducing water to dissolve the powder. The mixing chamber provides sufficient agitation with the water to dissolve and froth the coffee.

If it is desired to produce a beverage comprising milk where milk is prepared from soluble milk powder with such a chamber, some problems arise.

First, a milk beverage such as a coffee latte or a cappuccino requires a certain volume of milk, generally of about 100 ml of milk or even bigger. It is much more than the volume for preparing a coffee espresso that is about 60 ml. It means that a large quantity of milk powder is introduced in the chamber, such as 8 g to produce a cappuccino and 11 g for a latte. Such a quantity fills a quite important part of the internal volume of the chamber and it becomes difficult for the water jet introduced in the chamber to dissolve the whole milk powder efficiently: lumps of powder are created and cannot be broken down, with the result that the chamber outlet become clogged. The same kind of issue has been noticed for instant soluble coffee when it is dissolved with cold water in order to prepare cold beverages.

Secondly, milk powders are not as soluble as instant coffee powders meaning that more energy and/or more time is required to get a full dissolution. For most of the existing milk powders or creamer powders, it is even impossible to fully dissolve the powder and lumps remain present. The dissolution can be improved by adding additives to the milk powder such as sugar but this approach is not satisfying in terms of taste of the beverage. Moreover, it presents a negative impact on consumer health and on the cost of the product.

A solution to solve this problem may be to use a clamping device to close or open the beverage outlet and/or to use a mixing chamber comprising a motorised mixing device. With the clamping device, it is possible to close the outlet during the dosing of powder and as long as the beverage preparation is not finished. Yet such a clamping device must be actuated by a motor with a direct impact on the cost of the machine. Similarly, the use of a motorised mixing device such as a whipper, although extremely efficient, is not desired.

There is a need for providing a beverage apparatus which enables the preparation of a beverage from a hardly dissolvable beverage powder, such a milk or creamer powder, with a mixing chamber devoid of motor.

It would be advantageous to provide a beverage apparatus which enables the preparation of a beverage from a hardly dissolvable beverage powder by upgrading existing mixing chambers in which water is introduced under the form of a jet.

SUMMARY OF THE INVENTION

In a first aspect of the invention, there is provided a beverage preparation apparatus, said apparatus comprising at least one chamber for receiving and mixing water and at least one soluble beverage ingredient, said chamber comprising:
- a lateral side wall defining an internal mixing volume,
- a bottom wall comprising a beverage outlet,
- at least one water supply device configured for creating a jet of water and orienting said jet of water inside the chamber,
- at least one rotating device configured to rotate around a rotational axis inside the mixing chamber, said rotating device comprising blades, wherein the blades of the rotating device are freely rotatable around the rotational axis, and wherein the jet of water introduced in the chamber is oriented to hit the blades of the rotating device and actuate the rotation of the rotating device around the rotational axis.

The chamber of the apparatus comprises a lateral side wall. The chamber can take various shapes. In a preferred mode, the lateral side wall is substantially cylindrical. Other shapes can be envisaged such as oval section of the chamber, for instance.

Preferably, the chamber is positioned in the apparatus so that the lateral side wall is substantially vertical.

Preferably, at least the lower part of the lateral side wall is cylindrical. The rest of the lateral side wall can be cylindrical too or can open out to increase the horizontal cross section of the chamber.

Usually the top of the chamber is at least partially opened. Soluble beverage ingredient can be introduced in the chamber through the opened top by gravity fall.

The chamber comprises a bottom wall. This bottom wall comprises a beverage outlet. Generally, the beverage outlet is opened; no actuating device is provided to close the beverage outlet during beverage preparation.

The chamber can comprise a divider designed to divide the conduit of the beverage outlet in several equal channels. Generally, the beverage outlet is a straight conduit, preferably vertically oriented, and this conduit can be subdivided in at least two, preferably four straight equal sub-conduits. For such a divider presenting a cross section dividing the conduit in four equal channels, preferably, the length of the conduit of the beverage outlet is greater than the diameter of the beverage outlet, preferably greater than two times the diameter of the beverage outlet.

The chamber comprises at least one water supply device configured for creating and introducing a jet of water inside the chamber.

The water supply device is configured so that water is introduced in the chamber under the form a jet of liquid. By jet, it is understood a stream of liquid that comes out of the liquid supply device and in the chamber quickly and with force. Accordingly the water supply device is configured for introducing water in the inner chamber with a high velocity. Usually, the water supply device is a nozzle designed to produce a jet of water, preferably a straight jet of liquid.

The size of the water nozzle outlet, the position of the rotating device inside the chamber, the transversal cross section area of the chamber and the pressure of water introduced inside the nozzle are generally adapted accordingly to get the high velocity of the jet, the rotation of the rotating device, and preferably a swirling effect of water along the lateral side wall of the chamber.

Generally, the nozzle presents an outlet section with a surface area equivalent to the surface of a circular surface of diameter comprised between 0.2 and 0.8 mm, preferably between 0.3 and 0.5 mm and even more preferably of about 0.4 mm.

With such a dimension, the delivery of water at a pressure comprised between 2 and 10 bar, preferably of at least 6 bar, in the nozzle enables the production of a jet of high velocity.

The mixing chamber comprises at least one rotating device positioned inside the mixing chamber and able to rotate around a rotational axis (XX'). This rotating device comprises blades that are freely rotatable around this rotational axis. By freely rotatable, it is meant that the blades are not attached to any driving or actuating means to control (initiate or stop) their rotating movement. Blades are free to rotate under the action of any fluid force applied to them inside the chamber.

The jet of water introduced in the chamber is oriented by the water supply device to hit the blades of the rotating device and, consequently, to actuate the rotation of the rotating device around the rotational axis since the blades are freely rotatable.

As a result, the water supply device supplies water to dissolve the beverage ingredient and, simultaneously, generates the force to actuate the rotating device that is to rotate the blades of the rotating device. It means that, while water is introduced, the blades mix said water with the soluble beverage ingredient and create a powerful vortex or swirl of beverage liquid; the dissolution is greatly improved compared to the situation where no blades are present and where there is a swirl of water produced by the jet only.

Preferably, the rotating device is positioned above the beverage outlet. This position of the rotating device guarantees that no soluble beverage ingredient reaches the beverage outlet without being agitated by the blades. The creation of lumps of powder is avoided. This position of the rotating device avoids that a part of the dose of beverage ingredient introduced initially in the chamber may directly fall through the beverage outlet: the rotating device can act as partial plunger.

According to one first mode, the rotating device can be positioned on a fixed shaft around which it is freely rotatable.

In that embodiment, the mixing chamber comprises a rod, that is fixed. This fixed rod preferably extends in parallel to the longitudinal axis of the chamber. The rotating device is able to freely slide in rotation around that fixed rod.

The top of the rod can be attached to upper retaining means. Preferably, these upper retaining means are removably attachable to the top of the mixing chamber. The bottom of the rod can be attached to lower retaining means. These lower retaining means are preferably removably positioned inside the beverage outlet.

By being removably positioned, the upper and retaining means facilitates cleaning and maintenance of the chamber.

According to one alternative second mode, the rotating device is attached to a rod and said rod is freely maintained in rotation inside the chamber.

In this second mode, the blades and the rod are attached one to the other and, accordingly, move together. The rotation of the blades, under the force of the water jet, induces the rotation of the rod too. Since the rod is freely maintained in rotation inside the chamber, the blades are able to freely rotate too.

The top of such a shaft can be maintained freely in rotation by a ring, said ring being preferably removably attachable to the top of the mixing chamber.

The top of the rod can be freely maintained by upper maintaining means, preferably removably attachable to the top of the mixing chamber. The bottom of the rod can be freely maintained by lower maintaining means, preferably removably positioned inside the beverage outlet.

Generally, the rotating device comprises more than five blades. This configuration guarantees that the jet is able to hit at least one blade when it is introduced inside the chamber and this whatever the position of the blades at rest inside the chamber.

Preferably, the rotating device comprises six blades. Such a preferred embodiment limits the retention of liquid and/or powder between the blades compared to a higher number of blades.

Generally the at least one water supply device is positioned inside the lateral side wall of the chamber. Preferably, this water supply device is positioned in the lower part of the chamber.

Accordingly the chamber is filled with liquid from the bottom.

In the preferred embodiment, the at least one water supply device can be a nozzle positioned and introduced inside the lateral wall of the chamber.

According to a less preferred embodiment, the nozzle can be designed inside the cylindrical lateral side wall. Consequently, the chamber and the nozzle can be made of one single piece of material.

Alternatively, the at least one water supply device can be positioned above the top of the chamber. With this alternative embodiment, a current mixing chamber with a water inlet at the top can be used.

The water supply device and the internal shape of the chamber can be configured so that the jet of water is able to form a swirl inside the chamber.

Preferably, the internal shape of the chamber is at least partly cylindrical and the jet of water extends transversely through the internal volume of the chamber along a line L, said line L being offset relative to the longitudinal central axis of the chamber. More specifically, the line L can be oriented in a direction so that a ratio $d/r_0$ is comprised between 0.2 and 0.4, preferably is of about 0.3, where $r_0$ is the radius of the cylindrical lateral side wall of the chamber and d is the distance measured orthogonally from the line L to the central longitudinal axis of the chamber.

The mixing chamber of the apparatus is devoid of motor. Mixing and frothing happen under the action of the water jet only.

Generally, the beverage preparation apparatus comprises a water supply system connectable to the water supply device of the chamber. Generally, the water supply system of the apparatus comprises at least a water tank or water supply, a water pump, a water heater and/or cooler and a valve for actuating the water delivery. The system can also comprise a selection valve for delivering water at either hot or cold temperature.

Generally the beverage preparation apparatus comprises a receiving area in order to removably position the chamber inside the apparatus and to connect the water inlet of the chamber to the water supply system. Accordingly, the chamber can be removed for cleaning and maintenance.

Preferably, the beverage preparation apparatus comprises a dosing device configured for dispensing a dose of soluble beverage ingredient in the chamber.

Generally, the dosing device is placed above the chamber in order to feed it by gravity fall. The dosing device can be associated to a powder reservoir or a liquid concentrate reservoir. In a variant, the apparatus can be devoid of dosing device and beverage ingredient reservoir. Then, beverage ingredient can be introduced in the chamber manually.

According to a second aspect, there is provided a rotating device configured to be positioned in the mixing chamber of a beverage preparation apparatus, said chamber comprising:
a lateral side wall defining an internal mixing volume,
a bottom wall comprising a beverage outlet,
at least one water supply device configured for creating a jet of water and orienting said jet of water inside the chamber,
said rotating device comprising:
blades, the blades of the rotating device being freely rotatable around a rotational axis, and
positioning means configured to position the blades in the mixing chamber so that the jet of water introduced in the chamber hits the blades and actuates the rotation of the blades around the rotational axis.

This rotating device can be advantageously used to upgrade the mixing chamber of a beverage preparation apparatus, like the apparatus described in WO 2008/071613. By adding the rotating device, new types of beverages can be prepared even if they are prepared from hardly soluble beverage ingredient or from important volume of soluble beverage ingredient.

According to a third aspect, there is provided a method for producing a beverage in a beverage preparation apparatus such as described above, said method comprising the steps of:
dosing the chamber with soluble beverage ingredient, and introducing water through at least one water supply device of the chamber.

The dosing of the ingredient is usually automatic and controlled by a controller of the apparatus. Yet, in a particular mode, the dosing of the ingredient can be manually made by manual actuation of a dosing device or with a spoon and beverage ingredient jar or with a stick pack.

In one embodiment, the chamber can be dosed with soluble beverage ingredient before water is introduced in the chamber. This embodiment avoids that a dosing device positioned above the chamber becomes wetted by the steam and humidity rising from the chamber when water is present inside the chamber. The outlet of the dosing device can be closed and protected during beverage preparation.

The soluble beverage ingredient can be selected in the list of soluble coffee (instant coffee) powder, chocolate powder, milk powder and mixtures thereof. Mixtures of sugar, instant coffee and milk powder known as coffee mixes can also be used. Other soluble powder ingredients like soluble tea, dehydrated culinary ingredients, milk based ingredients and/or non-dairy creamers can be used. The device and the method of the present invention are applicable too to the dissolution of liquid concentrates with water. Such liquid concentrates may be coffee, chocolate, tea or milk concentrates or syrups.

In the present application the terms "internal", "top", "bottom" and "lateral" are used to describe the relational positioning of features of the invention. These terms should be understood to refer to the container in its normal orientation when positioned in a beverage preparation apparatus for the production of a beverage as shown in the FIGS. 2A, 3A, 4, 6 and 10.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
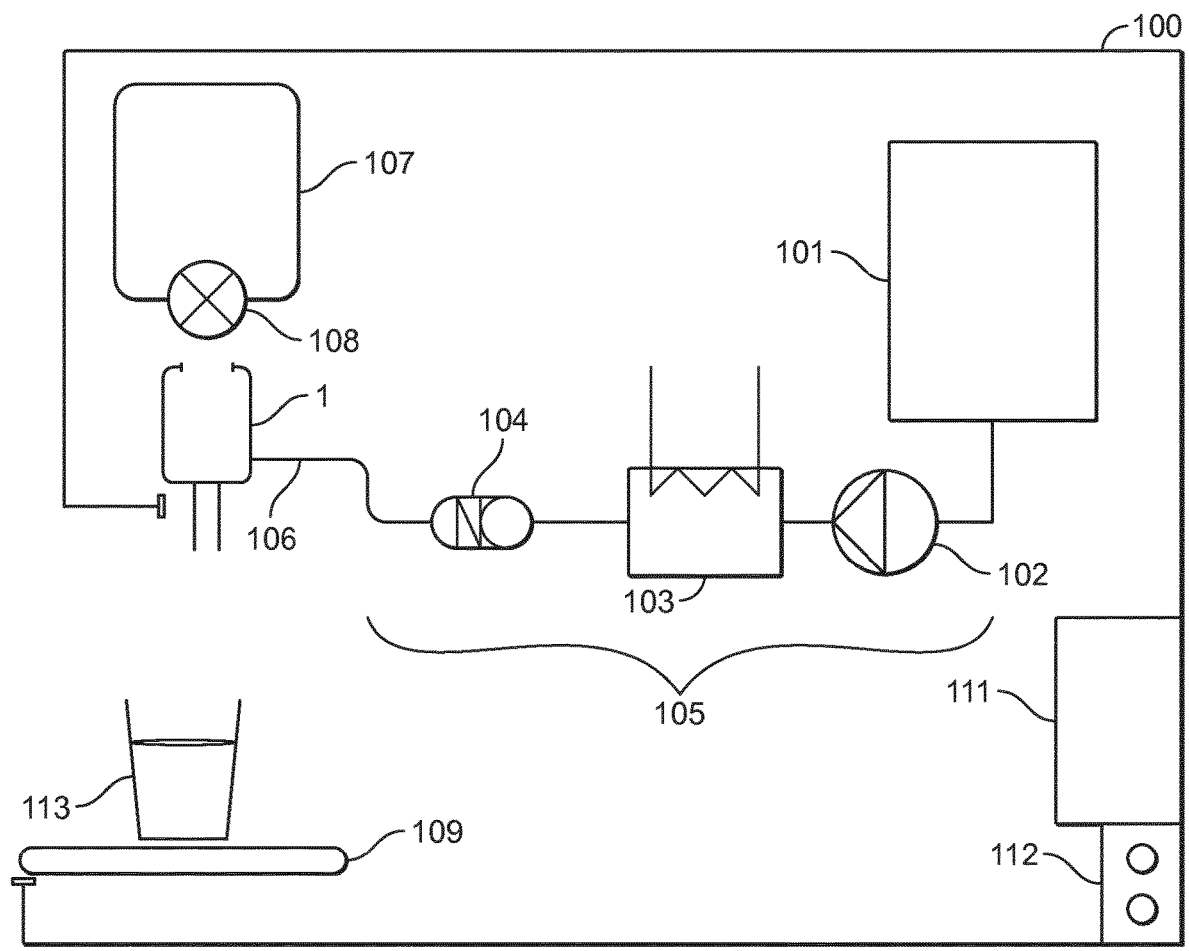
FIG. 1 is a schematic view of a beverage preparation apparatus according to the present invention.

FIG. 1 illustrates a beverage preparation apparatus 100. The apparatus includes a mixing chamber 1 for producing a beverage from a soluble beverage ingredient and liquid, preferably water, entering the chamber.

The beverage ingredient is stored in a container 107. The container can be a hopper which is permanent or a disposable package containing the beverage ingredient.

A dose of beverage ingredient is metered and dispensed by a dosing device 108. The dosing device has the primary function to meter upon request doses of ingredient into the mixing chamber 1. The dosing device dispenses the dose of beverage ingredient in mixing chamber 1, generally by gravity fall in a top opening of the chamber.

The dosing device can be any suitable system such as a dosing screw, a reciprocating dosing piston or a rotating disc. The dosing technology is also of course dependent on the nature of the soluble ingredient. The soluble ingredient is typically a dry beverage powder, preferably mild powder. However, it could also be a liquid concentrate such as milk concentrate. The device is fed upon request with ingredient manually or automatically as prompted by a controller 111 and command 112.

When the beverage ingredient is a powder, this dosing device can be a rotating device such as described in WO 2009/144239 or translating drawer with a dosing cavity.

According to a particular embodiment (not illustrated), the beverage preparation apparatus can be deprived of reservoir and dosing device. Accordingly, the user can introduce a dose of ingredient in the chamber manually using a spoon or a stick of powder.

A water supplying system 105 is provided in the machine to be able to feed water in the mixing chamber 1.

The water supplying system comprises:
- a tank 101 that can be replenished with fresh water, or eventually connected to tap water,
- a water pump 102 for pumping water from the tank 101. The pump can be any type of pump such as a piston pump, diaphragm pump or a peristaltic pump.
- a water heater 103 such as a thermoblock or a cartridge type heater to heat the pumped water, alternatively or in addition to, the machine can comprise a water cooler in a line bypassing the heater,
- a non-return valve 104.

Finally water is fed into the mixing chamber by a tube 106. In a variant, not illustrated, water can be fed by two tubes 106 in two different inlets of the chamber.

As illustrated in FIG. 1, the mixing chamber 1 can be placed directly above a service tray 109 onto which is placed a drinking receptacle 113 to receive the beverage. Generally, the mixing chamber 1 is removable from the machine for cleaning and optionally for dosing. Usually the machine comprises a mixing chamber receiving area to removably fix the chamber inside and provide cooperation between the mixing chamber liquid inlet(s) and the liquid supply tube(s) 106.

Usually, the chamber is immobile within the apparatus. Yet, in a less preferred embodiment, the mixing chamber 1 can be movable to a position placed under the dosing device 108 as described in WO 2009/153157.

The controller 12 can coordinate dosing of the soluble beverage ingredient by the dosing device 108 and dosing of liquid by the pump 102 upon the user actuating or being prompted to press the command 112 on the apparatus.

Figure 2A:
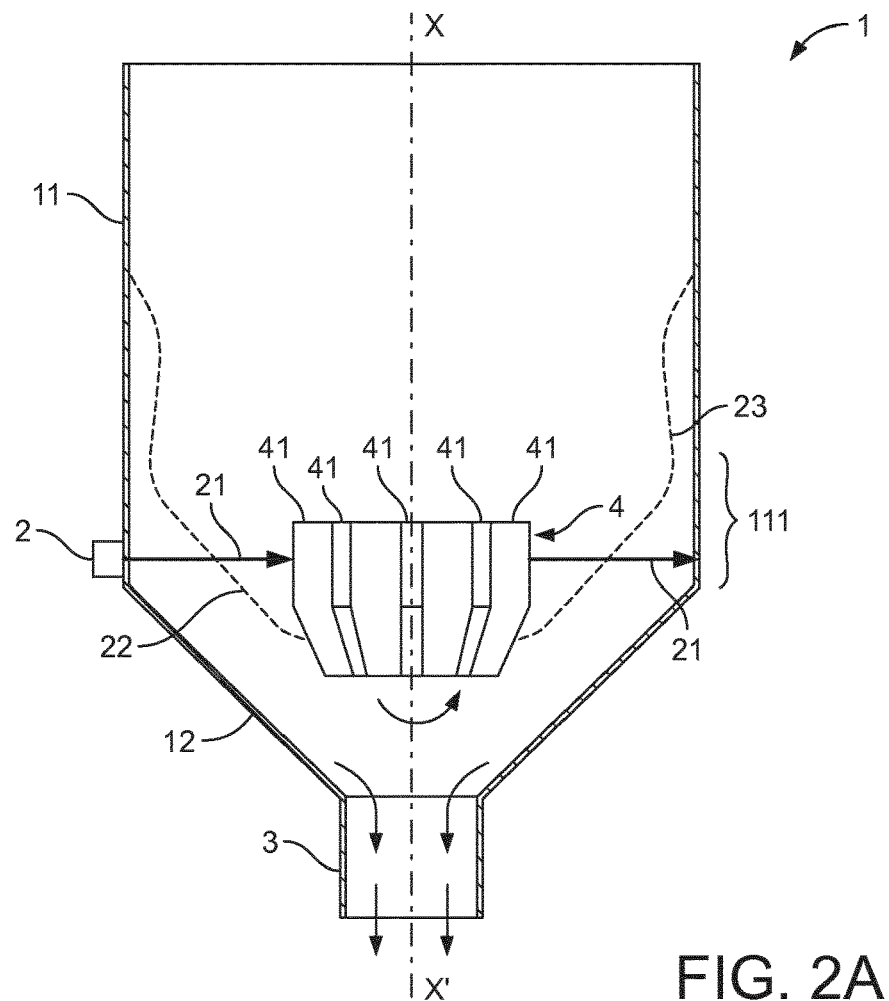
FIG. 2A is a schematic vertical cross section of a mixing chamber used in the apparatus of the present invention and FIG. 2B is the corresponding top view.
Figure 2B:
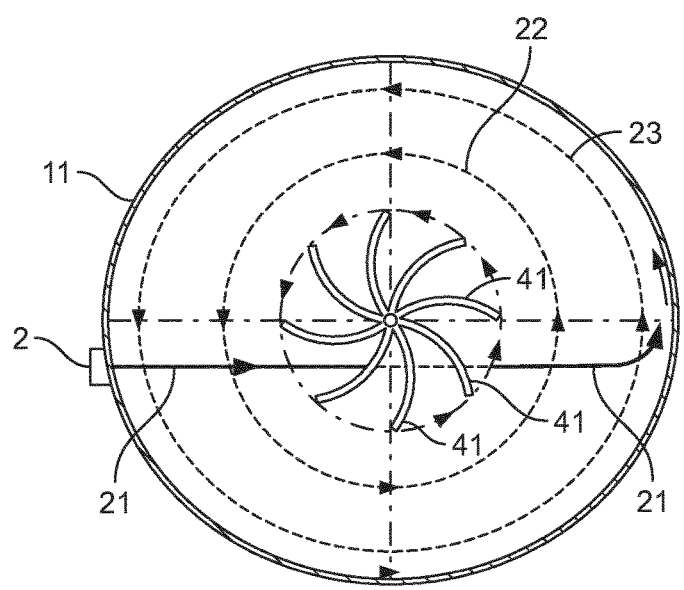

FIGS. 2A and 2B are schematic representations of the mixing chamber used in the apparatus of the present invention and the path of liquid in the chamber when water is introduced by the water supply device.

The chamber 1 comprises a lateral side wall 11 and a bottom wall 12. These walls define an internal volume able to contain a liquid. The lower part 111 of the lateral side wall is preferably cylindrical. This lower part comprises the water supplying device 2 designed to introduce a water jet 21 inside the chamber.

The bottom wall comprises the beverage outlet 3 and presents preferably a funnel shape in order to fully evacuate the liquid from the chamber.

Inside the chamber a rotating device 4 comprising blades 41 is positioned in order to be freely rotatable along an axis XX'. Preferably this axis extends in parallel to the longitudinal axis of the chamber. As a result, the vortex created by the rotating device can raise homogeneously along the lateral side wall of the chamber. In general, these axis are oriented essentially vertically.

Preferably, the rotating device is centred above the beverage outlet 3. This position can increase the full dissolution of the beverage ingredient before leaving the chamber.

The water supply device 2 supplies a jet 21 oriented to hit the blades 41 and to make then rotate around the axis XX'. Consequently, the water jet 21 is the driving force actuating the rotation of the blades 41. The rotation of blades creates a swirl or vortex of liquid wherein water introduced by the water jet and of beverage ingredient introduced in the chamber can be thoroughly mixed before the resulting beverage flows through the beverage outlet. In addition, any lump is energetically broken by the blades and dissolved by water.

Preferably, the strength of the jet is also set so that the jet of water pursues its way after hitting the blades and reaches the lateral side wall 111 at the part opposed to the position of the water supply device 2. Consequently, in addition to the swirl 22 created by the rotating device, an additional swirl 23 can be created along the side wall of the chamber, in particular if the lateral wall is essentially cylindrical. The advantage of this additional ascending swirl 23 is to keep the liquid longer inside the chamber: the contact between water and the soluble beverage ingredient is increased, the mixing more efficient. In addition, as long as water is introduced through the water supplying device, the water jet 21 hits both swirls 22, 23 of water along the lateral wall 111 and provides even more agitation.

Figure 3A:
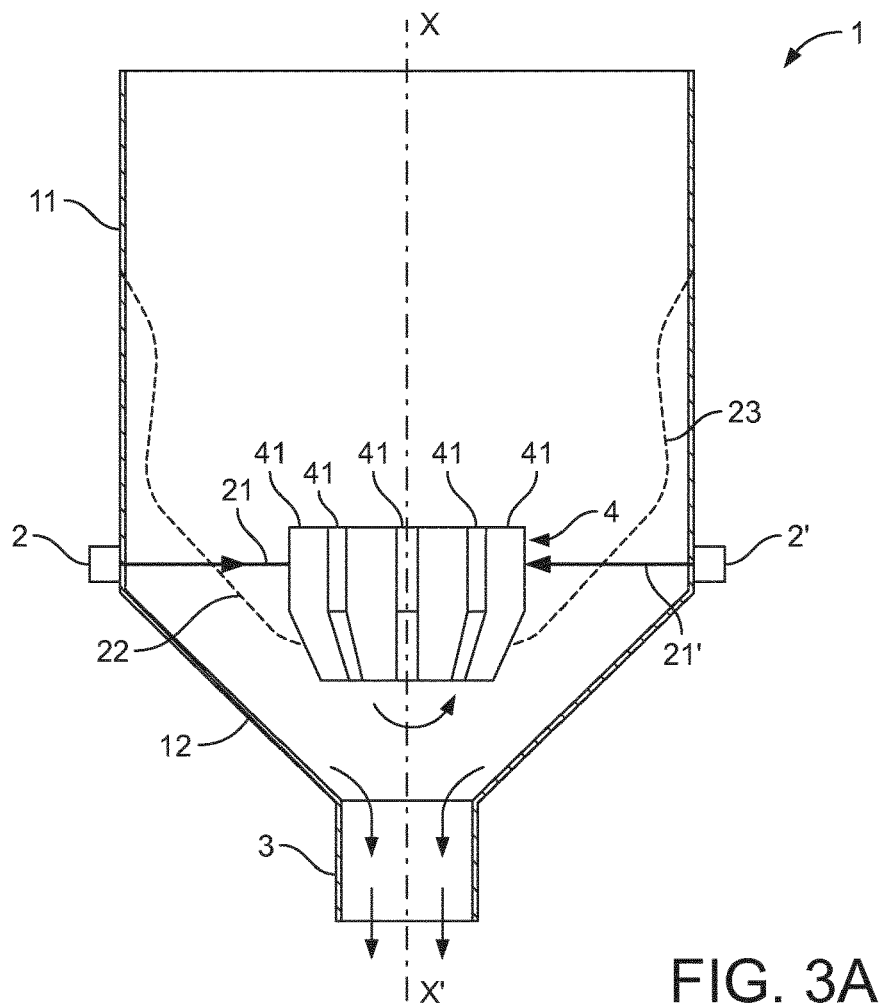
FIGS. 3A and 3B illustrate a variant of FIGS. 2A, 2B.
Figure 3B:
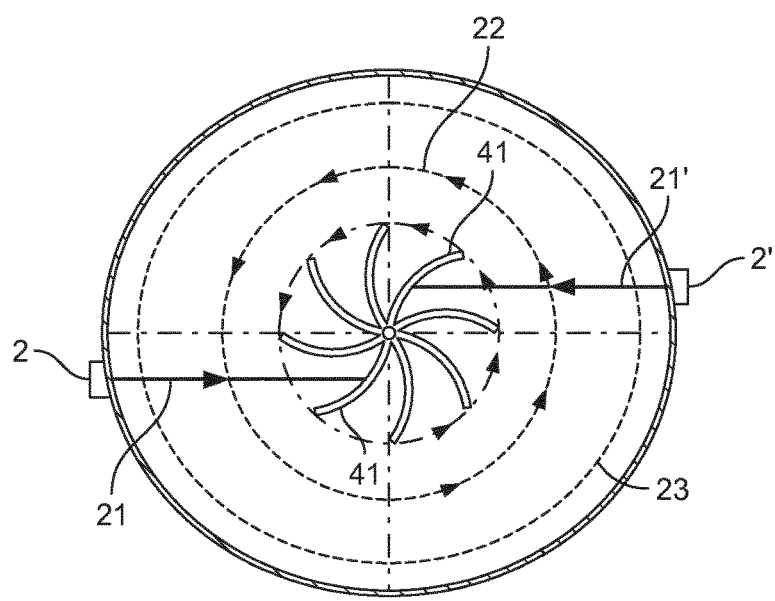

FIGS. 3A and 3B illustrate a variant of the mixing chamber illustrated in FIGS. 2A, 2B: a second water supplying device 2' supplies a second water jet 21' inside the chamber. The second water jet 21' is oriented to hit the blades 41 of the rotating device at a position different from the first water jet 21. As a result, the power of rotation of the blades is increased; specifically, this configuration limits the risk that the rotating device is blocked by an important quantity of beverage ingredient at the beginning. Having two jets guarantee that at least one jet is able to hit one blade and rotate the rotating device. Besides, with two jets, the required dose of water to produce the beverage is also introduced in a shorter time meaning shorter preparation.

Figure 4:
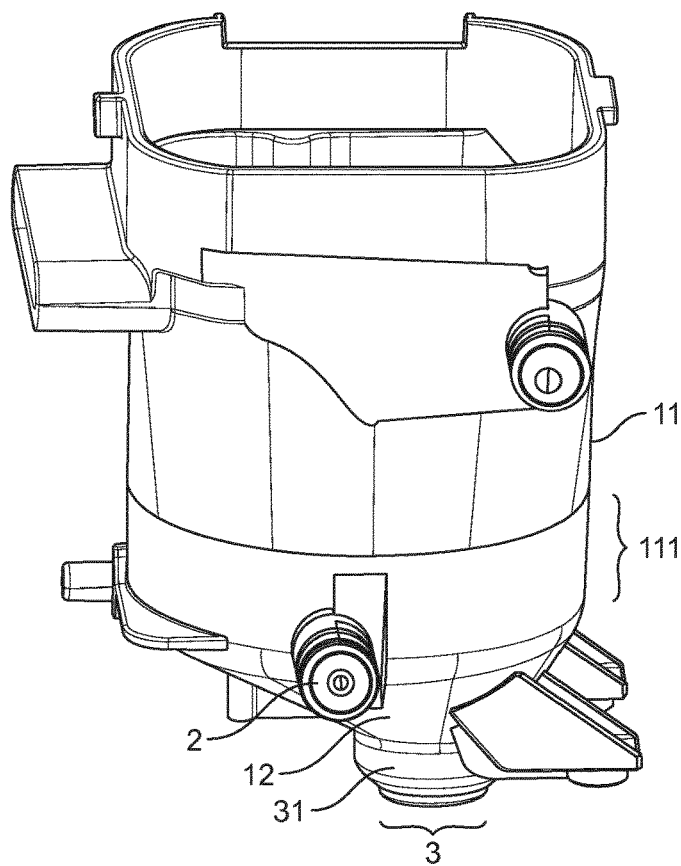
FIG. 4 is a perspective view of a chamber used in the apparatus of the present invention.
Figure 5:
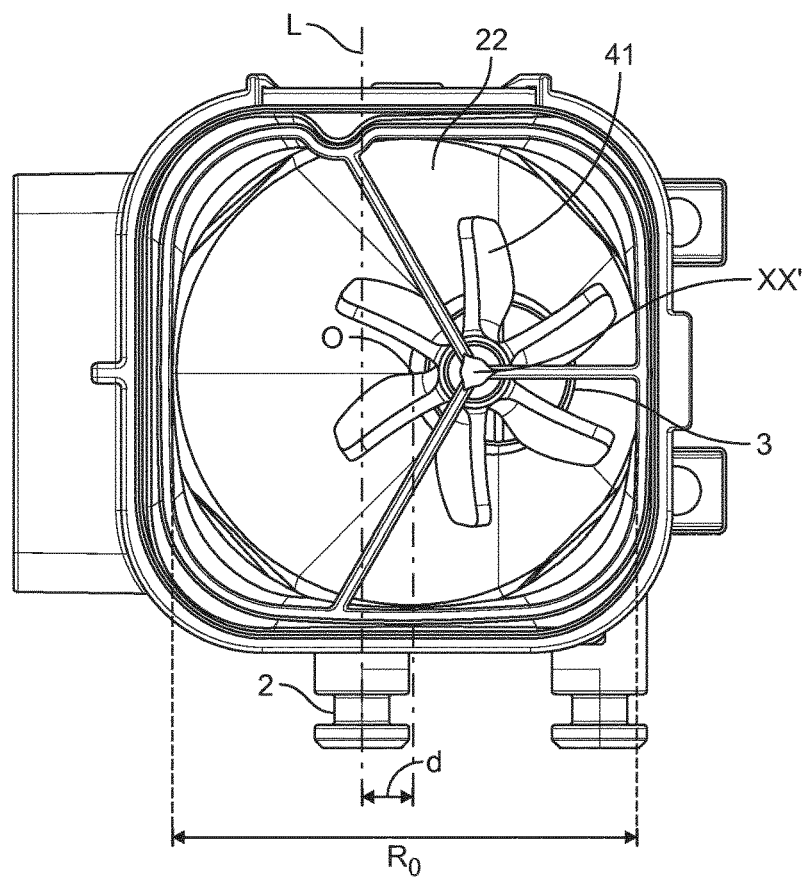
FIG. 5 is a top view of the chamber of FIG. 4, FIG. 6 provides a vertical cross section of the mixing chamber of FIGS. 4 and 5, FIG. 7 provides another vertical cross section of the mixing chamber of FIGS. 4 and 5 through the water injection device, FIG. 8 corresponds to FIG. 5, the rotating device having been removed therefrom.

FIGS. 4 and 5 are perspective and top views of a chamber used in the apparatus of the present invention.

The chamber 1 comprises a lateral side wall 11 and a bottom wall 12. These walls define an internal volume able to contain a liquid. The lower part 111 of the lateral side wall is preferably cylindrical. In this particular embodiment, the upper part 112 of the lateral side changes progressively to the cross section of a square with rounded corners. This upper shape enables an increase of the internal volume of the chamber. It does not affect the preparation of the beverage that essentially happens in the lower part of the chamber.

The chamber comprises a bottom wall 12 in which a beverage outlet 3 is designed. The beverage outlet is positioned at the lowest position of the of the bottom wall. Preferably the bottom wall 12 presents the shape of a funnel inclined in direction of the outlet to facilitate full liquid evacuation and cleaning of the chamber. The beverage outlet preferably comprises a conduit 31. Usually such a conduit enables the stabilisation of the beverage movement before it is dispensed in a drinking cup: splashes and drops are prevented.

Figure 10:
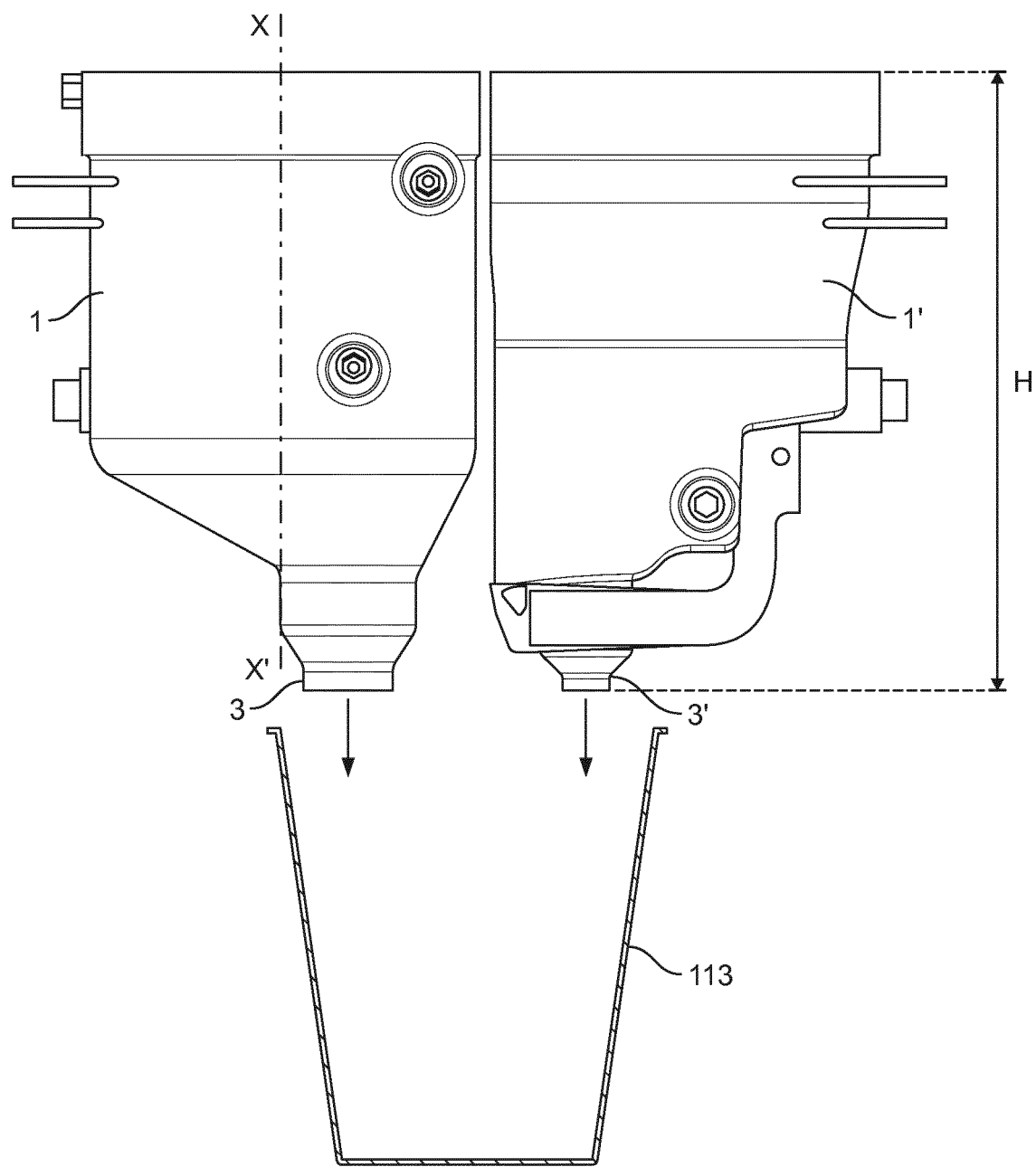
FIG. 10 is an illustration of two chambers positioned aside.

In the illustrated embodiment, the outlet is not centred on the longitudinal central axis of the cylindrical lateral side wall chamber but is offset. This illustrated embodiment enables the dispensing of the beverage in a receptacle 113 positioned to receive a beverage from a beverage dispensed from the outlet 3' of another chamber 1' positioned aside the chamber 1 as illustrated in FIG. 10. For example, one chamber enables the preparation of coffee, whereas the other chamber enables the preparation of milk.

In another embodiment wherein there is no such constraint, the chamber the conduit of the beverage outlet can be centred on the longitudinal central axis of the chamber.

As illustrated, the lateral side wall 11 can be such that its longitudinal distance (height) is close to its cross section dimension (diameter). Consequently, the internal volume of the chamber sufficiently large without increasing the height of the chamber and, as a result. the height of the apparatus. The diameter can be comprised between 40 and 70 mm and the height between 40 and 80 mm. The internal volume is generally set so as to be able to hold a volume of liquid comprised between 40 and 100 ml.

The lateral side wall 11 comprises a water supply device 2. This device 2 is positioned close to the bottom wall 12 of the chamber. Generally, the distance between the bottom of the chamber and the central axis of the liquid inlet is comprised between 5 and 20 mm.

Figure 7:
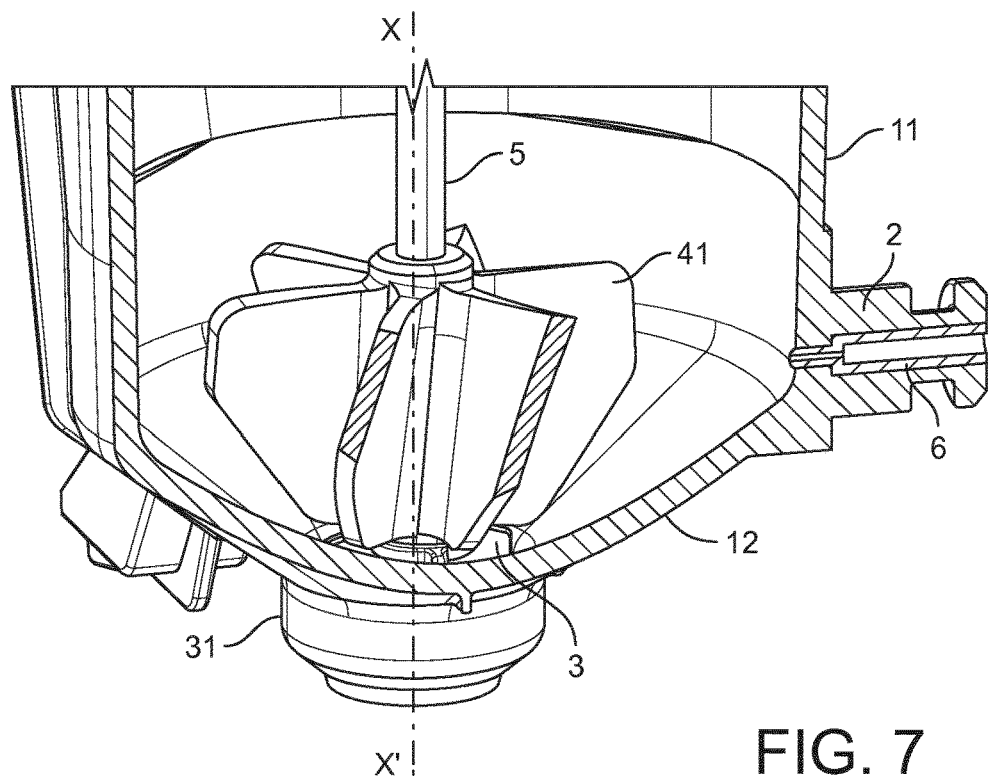

This device 2 is configured so that the liquid is introduced in the chamber as a jet of water. Preferably, this jet is produced by and emerges from a nozzle 6 positioned in the lateral wall of the chamber as illustrated in FIG. 7 that is a vertical cross section of the chamber traversing the water inlet device 2.

The liquid inlet is also configured so that the jet of water extends transversely through the internal volume of the chamber along a line L, said line L being offset relative to the longitudinal central axis of the chamber passing through point O, as illustrated in the top view of the chamber in FIG. 5.

More specifically, the line L is oriented in a direction so that a ratio $d/r_0$ is comprised between 0.2 and 0.4, preferably of about 0.3, where $r_0$ is the radius of the cylindrical lateral side wall 11 and d is the distance measured orthogonally from the line L to the central longitudinal axis of the chamber.

Generally, the nozzle presents an outlet section with a surface area equivalent to the surface of a circular surface of diameter comprised between 0.2 and 0.8 mm, preferably between 0.3 and 0.5 mm and even more preferably of about 0.4 mm. With such a dimension, the delivery of water at a pressure comprised between 2 and 10 bar, preferably of at least 6 bar, in the nozzle enables the production of a jet able to hit and actuate the blades.

As illustrated, the liquid inlet can be also configured so that the jet of water is inclined downwardly in direction of the opposed surface of the lateral wall. When the soluble beverage ingredient is a powder and the beverage preparation requires a certain amount of powder, the powder is usually dosed before water is introduced in the chamber. In that case, the inclined jet of water flows directly down the heap of powder which reduces the risk of powder flowing through the whole chamber and the creation of lumps. This is particular critical when the flow rate of the pump of the beverage preparation apparatus cannot be controlled. In the case where the pump can control this flow rate, the flow can be progressively increased at the beginning of the introduction of water in order to avoid powder hitting. In that case, the inclination of the liquid inlet is not necessary and the jet can be oriented horizontally.

As illustrated, the chamber can comprise an optional second liquid inlet 21 at the top of the chamber. This second liquid inlet can be used to rinse the chamber or to prepare a non-frothed beverage.

Figure 6:
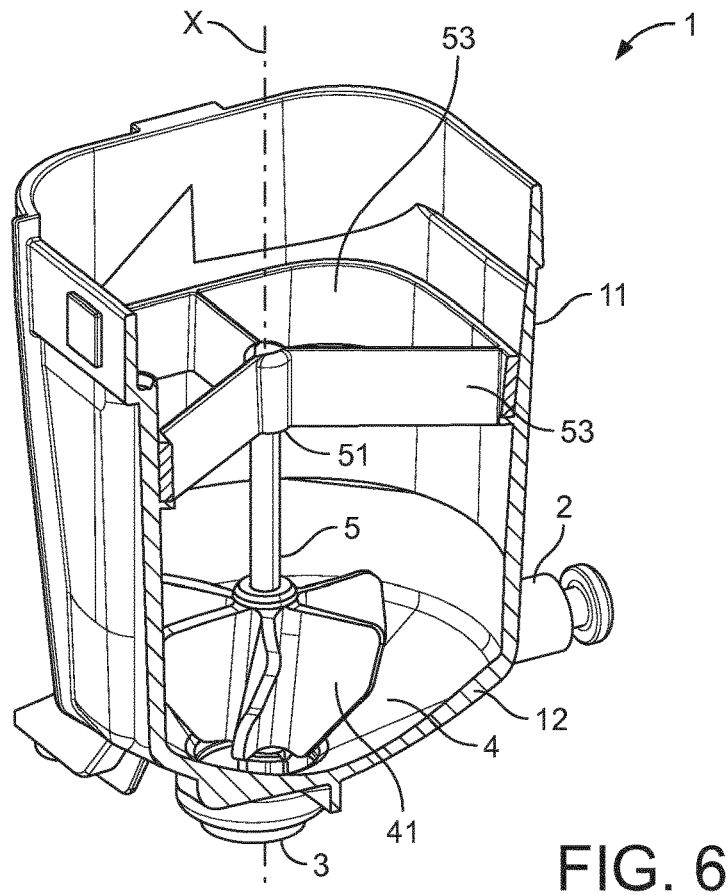

As illustrated in FIGS. 5 and 6, the chamber comprises a rotating device 4 comprising blades 41. This rotating device is freely rotatable around an axis XX' In the illustrated embodiment, the rotating device is positioned above the beverage outlet 3. As mentioned earlier, this position of the rotating device guarantees that no soluble beverage ingredient reaches the beverage outlet without being agitated by the blades.

Yet, it is possible to position the rotating device at a place off-centred from the outlet.

The blades 41 of the rotating device are positioned on the path of the water jet meaning that the water jet initiates the rotation of the blades 41 with the effect of agitating liquid inside the chamber.

It is visible form FIG. 7 that the water supply device 2 is a nozzle 6 fixed inside the lateral wall of the chamber 11. Yet, in another embodiment (not illustrated) the nozzle can be aside the chamber, preferably positioned above the chamber, in order to hit the blades from the top of the chamber.

Figure 8:
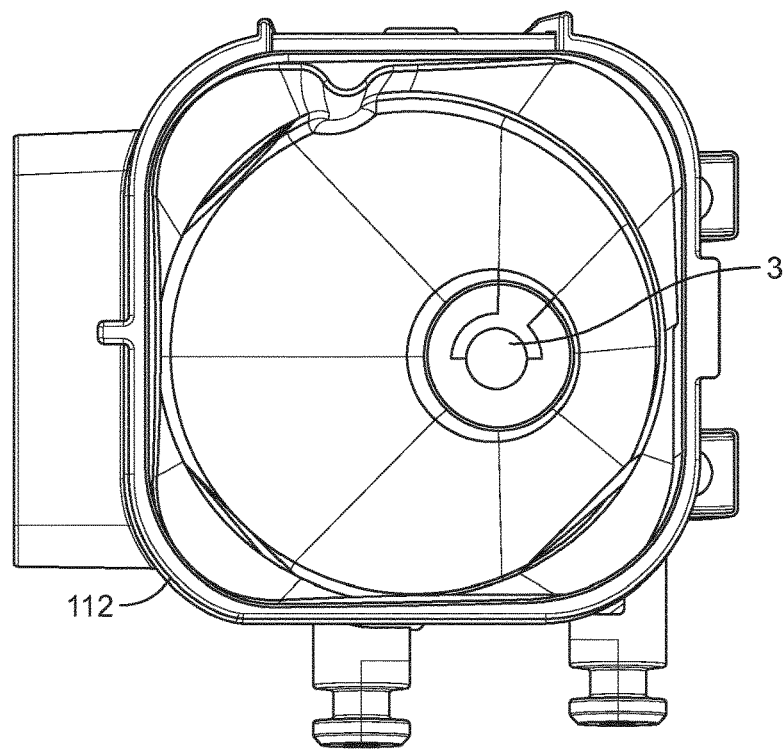
Figure 9:
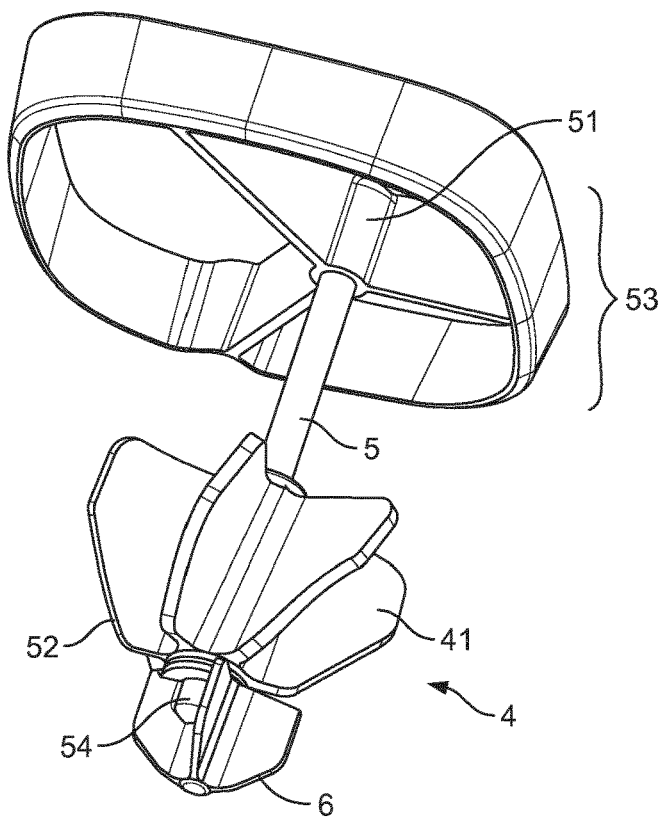
FIG. 9 is an isolated perspective view of the rotating device of FIG. 5.

As illustrated in FIGS. 6 and 7, the rotating device 4 is positioned on a fixed shaft 5 around which it is freely rotatable. The fixed shaft 5 provides the direction of the rotation axis XX' of the rotating device. The top 51 of the shaft is fixed by means of an upper retaining means 53 such as a ring attached to the top of the chamber and wings extending between the top of the fixed shaft and the ring. The bottom 52 of the shaft is positioned above the beverage outlet 3: the bottom 52 is attached to a lower retaining means 54 that is attached itself to a divider 6 positioned inside the outlet 3. FIG. 9 illustrates the rotating device 4 positioned on the shaft 5 and the retaining means 53, 54. The rotating device 4 is able to freely rotate around the shaft 5. The assembly is easily removable form the chamber during the cleaning operation: FIG. 8 illustrates the chamber 1, the rotating device and the retaining means being removed therefrom.

In a particular aspect of the invention, the device illustrated in FIG. 9 can be used as such to upgrade the existing mixing chamber of a beverage preparation apparatus such as illustrated in FIG. 8. The upper and lower retaining means 53, 54 and the rod 5 constitute positioning means configured to position the blades 41 in the mixing chamber to be upgraded so that the jet of water introduced in the chamber hits the blades and actuates the rotation of the blades around the rotational axis.

The beverage preparation apparatus of the present invention presents the advantage of enabling an efficient dissolution of any type of soluble beverage ingredient without the need to use a rotating blade actuated by a motor. As a result the cost of manufacturing of the machine remains low.

Another advantage is that a large range of beverages can be prepared since even hardly soluble powders can now be dissolved and dispensed. It results also that there is no need to add undesirable additives to the beverage ingredient to increase solubility.

Another advantage is that it becomes possible to prepare cold beverages by dissolution of soluble ingredient, like instant coffee, with cold water.

Another advantage is that it is possible to produce new highly efficient mixing chambers from existing mixing chambers by simply adding a removable rotating device. Already existing apparatus can be upgraded or new chambers can be produced from existing manufacturing tools without increasing costs importantly. Only software adaptation may be necessary to adjust the strength and the time dispensing sequence of the water jet.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS

| | |
|---|---|
| mixing chamber | 1 |
| lateral side wall | 11 |
| bottom wall | 12 |
| water supplying device | 2, 2' |
| water jet | 21, 21' |
| swirl of liquid | 22, 23 |
| beverage outlet | 3 |
| conduit | 31 |
| rotating device | 4 |
| blade | 41 |
| fixed rod | 5 |
| top | 51 |
| bottom | 52 |
| upper retaining means | 53 |
| lower retaining means | 54 |
| divider | 6 |
| beverage preparation apparatus | 100 |
| tank | 101 |
| pump | 102 |
| heater | 103 |
| valve | 104 |
| water supplying system | 105 |
| pipe | 106 |
| container | 107 |
| dosing device | 108 |
| service tray | 109 |
| controller | 111 |
| command | 112 |
| drinking receptacle | 113 |

The invention claimed is:

1. A beverage preparation apparatus comprising at least one chamber for receiving and mixing water and at least one soluble beverage ingredient, the at least one chamber comprising:
   a lateral side wall defining an internal mixing volume,
   a bottom wall comprising a beverage outlet, wherein the bottom wall has a funnel shape, and the beverage outlet is positioned at a lowest position of the bottom wall,
   at least one water supply device configured for creating a jet of water and orienting the jet of water inside the at least one chamber,
   at least one rotating device configured to rotate around a rotational axis inside the at least one chamber, the at least one rotating device comprising blades, and
   the blades of the at least one rotating device are configured to freely rotate around the rotational axis, and
   the jet of water introduced in the at least one chamber is oriented to hit the blades of the at least one rotating device and actuate rotation of the at least one rotating device around the rotational axis.

2. The beverage preparation apparatus according to claim 1, wherein the at least one water supply device is a nozzle.

3. The beverage preparation apparatus according to claim 1, wherein the at least one water supply device is positioned inside the lateral side wall of the at least one chamber.

4. The beverage preparation apparatus according to claim 1, wherein the at least one rotating device is positioned above the beverage outlet.

5. The beverage preparation apparatus according to claim 1, wherein the beverage outlet comprises a divider designed to divide a conduit of the beverage outlet in several equal channels.

6. The beverage preparation apparatus according to claim 1, wherein the at least one rotating device is positioned on a fixed rod and is freely rotatable around the fixed rod.

7. The beverage preparation apparatus according to claim 1, wherein the at least one rotating device is attached to a fixed rod and the fixed rod is configured to rotate freely inside of the at least one chamber.

8. The beverage preparation apparatus according to claim 1, wherein the at least one rotating device comprises at least five blades.

9. The beverage preparation apparatus according to claim 1, wherein the at least one water supply device and the internal shape of the chamber are configured so that the jet of water is able to form a swirl inside the chamber.

10. The beverage preparation apparatus according to claim 1, wherein an internal shape of the at least one chamber is at least partly cylindrical and the jet of water is configured to extend transversely through the internal mixing volume of the at least one chamber along a line L, the line L being offset relative to a longitudinal central axis of the at least one chamber.

11. The beverage preparation apparatus according to claim 1 comprising a water supply system connectable to the at least one water supply device of the at least one chamber.

12. The beverage preparation apparatus according to claim 1 comprising a dosing device configured for dispensing a dose of the at least one soluble beverage ingredient in the at least one chamber.

13. A rotating device for use in a mixing chamber of a beverage preparation apparatus, the mixing chamber comprising:
   a lateral side wall defining an internal mixing volume,
   a bottom wall comprising a beverage outlet, wherein the bottom wall has a funnel shape, and the beverage outlet is positioned at a lowest position of the bottom wall, and
   at least one water supply device configured for creating a jet of water and orienting the jet of water inside the at least one chamber,
   the rotating device comprising:
      blades being freely rotatable around a rotational axis, and
      a positioning member configured to position the blades in the mixing chamber such that the jet of water introduced in the mixing chamber hits the blades and actuates rotation of the blades around the rotational axis.

14. A beverage preparation apparatus comprising at least one chamber for receiving and mixing water and at least one soluble beverage ingredient, the at least one chamber comprising:
   a lateral side wall defining an internal mixing volume,
   a bottom wall comprising a beverage outlet, wherein the beverage outlet comprises a divider designed to divide a conduit of the beverage outlet in several equal channels,
   at least one water supply device configured for creating a jet of water and orienting the jet of water inside the at least one chamber, at least one rotating device configured to rotate around a rotational axis inside the at least one chamber, the at least one rotating device comprising blades, and the blades of the at least one rotating device are configured to freely rotate around the rotational axis, and the jet of water introduced in the at least one chamber is oriented to hit the blades of the at least one rotating device and actuate rotation of the at least one rotating device around the rotational axis.

15. A beverage preparation apparatus comprising at least one chamber for receiving and mixing water and at least one soluble beverage ingredient, the at least one chamber comprising:

a lateral side wall defining an internal mixing volume, a bottom wall comprising a beverage outlet, at least one water supply device configured for creating a jet of water and orienting the jet of water inside the at least one chamber, at least one rotating device configured to rotate around a rotational axis inside the at least one chamber, the at least one rotating device comprising blades, wherein the at least one rotating device is positioned on a fixed rod and is freely rotatable around the fixed rod, and the blades of the at least one rotating device are configured to freely rotate around the rotational axis, and the jet of water introduced in the at least one chamber is oriented to hit the blades of the at least one rotating device and actuate rotation of the at least one rotating device around the rotational axis.

16. A beverage preparation apparatus comprising at least one chamber for receiving and mixing water and at least one soluble beverage ingredient, the at least one chamber comprising:

a lateral side wall defining an internal mixing volume, a bottom wall comprising a beverage outlet, at least one water supply device configured for creating a jet of water and orienting the jet of water inside the at least one chamber, at least one rotating device configured to rotate around a rotational axis inside the at least one chamber, the at least one rotating device comprising blades, wherein the at least one rotating device is attached to a fixed rod and the fixed rod is configured to rotate freely inside of the at least one chamber, and the blades of the at least one rotating device are configured to freely rotate around the rotational axis, and the jet of water introduced in the at least one chamber is oriented to hit the blades of the at least one rotating device and actuate rotation of the at least one rotating device around the rotational axis.

17. A beverage preparation apparatus comprising at least one chamber for receiving and mixing water and at least one soluble beverage ingredient, the at least one chamber comprising:

a lateral side wall defining an internal mixing volume, a bottom wall comprising a beverage outlet, at least one water supply device configured for creating a jet of water and orienting the jet of water inside the at least one chamber, at least one rotating device configured to rotate around a rotational axis inside the at least one chamber, the at least one rotating device comprising blades, and the blades of the at least one rotating device are configured to freely rotate around the rotational axis, and the jet of water introduced in the at least one chamber is oriented to hit the blades of the at least one rotating device and actuate rotation of the at least one rotating device around the rotational axis, wherein an internal shape of the at least one chamber is at least partly cylindrical and the jet of water is configured to extend transversely through the internal mixing volume of the at least one chamber along a line L, the line L being offset relative to a longitudinal central axis of the at least one chamber.

* * * * *